US008659592B2

(12) United States Patent
Wang et al.

(10) Patent No.: US 8,659,592 B2
(45) Date of Patent: Feb. 25, 2014

(54) 2D TO 3D VIDEO CONVERSION

(75) Inventors: Haohong Wang, San Jose, CA (US);
Glenn Adler, Redwood City, CA (US)

(73) Assignee: Shenzhen TCL New Technology Ltd,
Shenzhen, Guangdon (CN)

( * ) Notice: Subject to any disclaimer, the term of this patent is extended or adjusted under 35 U.S.C. 154(b) by 1015 days.

(21) Appl. No.: 12/585,784

(22) Filed: Sep. 24, 2009

(65) Prior Publication Data

US 2011/0069152 A1 Mar. 24, 2011

(51) Int. Cl.
*G06T 15/00* (2011.01)
(52) U.S. Cl.
USPC ............................................ 345/419; 345/555
(58) Field of Classification Search
None
See application file for complete search history.

(56) References Cited

U.S. PATENT DOCUMENTS

| | | | |
|---|---|---|---|
| 6,477,267 B1 | 11/2002 | Richards | |
| 6,584,219 B1 | 6/2003 | Yamashita et al. | |
| 7,126,598 B2 | 10/2006 | Oh et al. | |
| 2002/0015048 A1* | 2/2002 | Nister | 345/625 |
| 2005/0146521 A1 | 7/2005 | Kaye et al. | |
| 2005/0231505 A1 | 10/2005 | Kaye et al. | |
| 2006/0107229 A1* | 5/2006 | Matthews et al. | 715/782 |
| 2007/0076187 A1* | 4/2007 | Goris et al. | 356/4.03 |
| 2008/0085049 A1 | 4/2008 | Naske et al. | |
| 2008/0150945 A1* | 6/2008 | Wang et al. | 345/427 |
| 2008/0165181 A1 | 7/2008 | Wang et al. | |
| 2009/0041337 A1* | 2/2009 | Nakano | 382/154 |
| 2009/0116732 A1 | 5/2009 | Zhou et al. | |
| 2009/0201300 A1 | 8/2009 | Liao | |
| 2010/0014781 A1* | 1/2010 | Liu et al. | 382/285 |
| 2010/0141757 A1* | 6/2010 | Baik et al. | 348/135 |
| 2011/0141113 A1* | 6/2011 | Feth et al. | 345/427 |
| 2011/0285813 A1* | 11/2011 | Girdzijauskas et al. | 348/42 |

FOREIGN PATENT DOCUMENTS

WO WO 2008/080156 A1 7/2008

OTHER PUBLICATIONS

International Search Report mailed on Mar. 5, 2010, in the PCT/US10/20319.
Battiato, S. et al., "3D Stereoscopic Image Pairs by Depth-Map Generation," in *Proc. 2nd International Symposium on 3D Data Processing, Visualization and Transmission*, pp. 124-131, 2004.
Battiato, S. et al., "Depth-Map Generation by Image Classification," in *Proc. SPIE*, vol. 5302, pp. 95-104, Apr. 2004.
Harman, P. et al., "Rapid 2D to 3D Conversion,"IS&T Reporter, "The Window of Imaging," vol. 17, No. 1. Feb. 2002 (4 pages).

(Continued)

*Primary Examiner* — Djenane Bayard
(74) *Attorney, Agent, or Firm* — Finnegan, Henderson, Farabow, Garrett & Dunner, LLP

(57) ABSTRACT

A method for real-time 2D to 3D video conversion includes receiving a decoded 2D video frame having an original resolution, downscaling the decoded 2D video frame into an associated 2D video frame having a lower resolution, and segmenting objects present in the downscaled 2D video frame into background objects and foreground objects. The method also includes generating a background depth map and a foreground depth map for the downscaled 2D video frame based on the segmented background and foreground objects, and deriving a frame depth map in the original resolution based on the background depth map and the foreground depth map. The method further includes providing a 3D video frame for display at a real-time playback rate. The 3D video frame is generated in the original resolution based on the frame depth map.

32 Claims, 8 Drawing Sheets

(56) References Cited

OTHER PUBLICATIONS

Levkovich-Maslyuk, L. et al., "Depth Image-Based Representation and Compression for Static and Animated 3-D Objects," *IEEE Trans. Circuits and Systems for Video Technology*, vol. 14, No. 7, pp. 1032-1045, Jul. 2004.

Mark, W. et al., "Post-Rendering 3D Warping," in *Proc. Symposium on Interactive 3D Graphics*, pp. 7-16, Apr. 1997.

McMillan, L. et al., "Plenoptic Modeling: An Image-Based Rendering System," in *Proc. SIGGRAPH 95*, pp. 39-46, 1995.

Stauffer, C. et al., "Learning Patterns of Activity Using Real-Time Tracking", *IEEE Trans. Pattern Analysis and Machine Intelligence*, pp. 747-757, Aug. 2000.

Wang, H. et al., "An Efficient Rate-Distortion Optimal Shape Coding Approach Utilizing a Skeleton-Based Decomposition," *IEEE Trans. Image Processing*, vol. 12, No. 10, pp. 1181-1193, Oct. 2003.

Wei, Q., "Converting 2D to 3D: A Survey," Technical Report, Delft Univ. of Technology, Netherlands, 2005.

White Paper, "Dynamic Digital Depth (DDD) and Real-time 2D to 3D Conversion on the ARM Processor," http://www.ddd.com/files/DDD-ARM%20Whitepaperv2.pdf, Nov. 2005.

\* cited by examiner

2D TO 3D VIDEO CONVERSION

TECHNICAL FIELD

The present disclosure relates to methods and systems for real-time 2D to 3D video conversion.

BACKGROUND

As three-dimension ("3D") TV has been foreseen as a part of a next wave of promising technologies for consumer electronics, the issue of lack of 3D content in the market has attracted much attention. Real-time two-dimension ("2D") to 3D video conversion technology, the fastest way to obtain 3D content from the existing 2D video content sources, such as DVD, Blu-ray, and broadcasting, has been extensively studied. However, some disclosed conversion techniques may not be ready for real-time usage due to their high computational complexity or unsatisfactory quality.

Some disclosed conversion techniques use knowledge obtained from semantic video content analysis to reconstruct 3D objects. Furthermore, other disclosed techniques use linear perspective to obtain a geometric depth map and use color-based segmentation to obtain a qualitative depth map, and then fuse the two maps to generate the final depth map. The semantic video content analysis and the color-based segmentation process significantly increase the computational complexity especially for HD video content.

SUMMARY

An example in accordance with the present disclosure includes a method for real-time 2D to 3D video conversion. The method includes receiving a decoded 2D video frame having an original resolution, downscaling the decoded 2D video frame into an associated 2D video frame having a lower resolution, and segmenting objects present in the downscaled 2D video frame into background objects and foreground objects. The method also includes generating a background depth map and a foreground depth map for the downscaled 2D video frame based on the segmented background and foreground objects, and deriving a frame depth map in the original resolution based on the background depth map and the foreground depth map. The method further includes providing a 3D video frame for display at a real-time playback rate. The 3D video frame is generated in the original resolution based on the frame depth map.

Another example in accordance with the present disclosure includes a 2D-to-3D video converter coupled to receive a decoded 2D video frame having an original resolution. The converter includes a downscaler to downscale the decoded 2D video frame into an associated 2D video frame having a lower resolution, and a scene object analyzer to segment objects present in the downscaled 2D video frame into background objects and foreground objects. The converter also includes a first depth map generator to generate a background depth map and a foreground depth map for the downscaled 2D video frame based on the segmented background and foreground objects, and a second depth map generator to derive a frame depth map in the original resolution based on the background depth map and the foreground depth map. Further, the converter includes a rendering engine to provide a 3D video frame for display at a real-time playback rate on a user device. The 3D video frame is generated in the original resolution based on the frame depth map.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and systems for real-time 3D video depth map generation by background tracking and structure analysis. The method and system disclosed herein process video frame depth estimation by using background tracking. Instead of seeking for the geometric structure for a whole frame, geometric structure of background objects is detected, while foreground objects are not considered in the structure analysis process, thereby enhancing execution speed and correctness of point of view. In exemplary embodiments, the foreground objects are not considered to contribute to the frame geometric structure if there is a background in the image. To the contrary, if the foreground objects have complicated texture or edge components inside, their consideration may unnecessarily increase computational complexity. In exemplary embodiments, a foreground object depth map is generated using a different model than used for background objects. After all depth maps are obtained, a final frame depth map is derived at the same level of resolution as that of the original image. The methods and systems discussed herein provide real-time 2D-to-3D video conversion, which derives depth maps from lower-resolution 2D frames and generates 3D video frames in the original resolution at a real-time playback rate on a user device.

Figure 1:
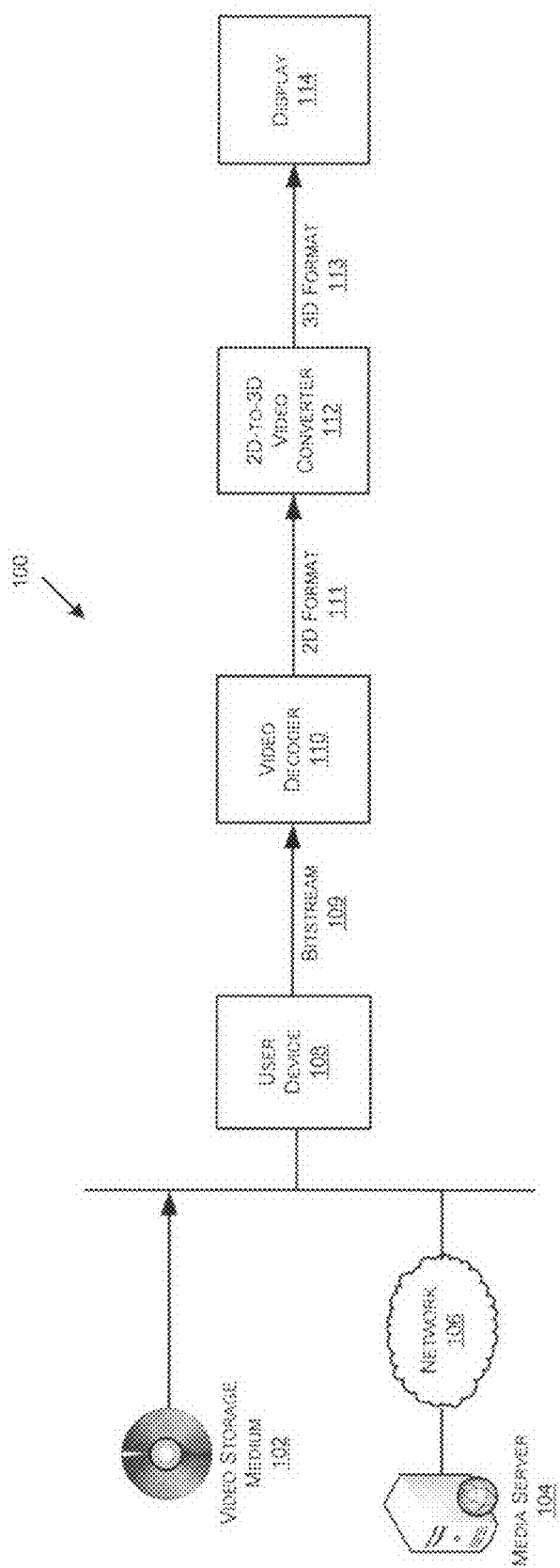
FIG. 1 illustrates a block diagram of an exemplary system.

FIG. 1 illustrates a block diagram of an exemplary system 100. Exemplary system 100 can be any type of system that provides video content over a local connection or a network, such as a wireless network, Internet, broadcast network, and etc. Exemplary system 100 can include, among other things, 2D video content sources such as a video storage medium 102, a media server 104, and/or network 106, a user device 108, a video decoder 110, a 2D-to-3D video converter 112, and a display 114.

Video storage medium 102 can be any medium storing video content. For example, video storage medium 102 can be provided as a video CD, DVD, Blu-ray disc, hard disk, magnetic tape, flash memory card/drive, volatile or non-volatile memory, holographic data storage, and any other storage medium. Video storage medium 102 can be located within user device 108, local to user device 108, or remote from user device 108.

Media server 104 is a computer server that receives a request for video content from user device 108, processes the request, and provides video content to user device 108 through, in some embodiments, network 106. For example, media server 104 can be a web server, an enterprise server, or any other type of computer server. Media server 104 can be a computer programmed to accept requests (e.g., HTTP, or other protocols that can initiate a video session) from user device 108 and to serve user device 108 with video content. Also, media server 104 can be a broadcasting facility, such as free-to-air, cable, satellite, and other broadcasting facility, for distributing digital or non-digital video content. Further, as an alternative to the configuration of system 100 shown in FIG. 1, media server 104 can include 2D-to-3D video converter 112 for converting 2D video into 3D video.

Network 106 can include any combination of wide area networks (WANs), local area networks (LANs), wireless networks suitable for packet-type communications, such as Internet communications, or broadcast networks or any combination thereof. These networks can be configured for distributing digital or non-digital video content. Further, as an alternative to the configuration of system 100 shown in FIG. 1, network 106 can include 2D-to-3D video converter 112 for converting 2D video into 3D video.

User device 108 is a hardware device such as a computer, a PDA, a cell phone, a laptop, a desktop, a VCR, a Laserdisc player, a DVD player, blue ray disc player, a television set including a broadcast tuner, or any electronic device capable of playing video. User device 108 can include software applications that allow device 108 to communicate with and receive video content from a data network, e.g., network 106, or local video storage medium 102. User device 108 can, by means of included software applications, transform received video content into digital format, if not already in digital format, and transmit a video bitstream 109 to video decoder 110. User device 108 can also include a software video player that allow the device to play video. Examples of software video players include Adobe Flash Video Player, Microsoft Windows Media Player, RealPlayer, or any other player application. Further, user device 108 can include 2D-to-3D video converter 112 for converting 2D video into 3D video, which is described below.

Video decoder 110 is a hardware device or software configured to decompress digital video. Video decoder 110 can receive (109) a 2D video bitstream, decode the bitstream into video frames, and provide (111) the decoded video frames to 2D-to-3D video converter 112. Video decoder 110 can be located within user device 108, local to user device 108, or remote from user device 108. Further, video decoder 110 can be located within 2D-to-3D video converter 112, local to 2D-to-3D video converter 112, or remote from 2D-to-3D video converter 112.

2D-to-3D video converter 112 is configured to perform real-time 2D-to-3D video conversion, through real-time 3D video depth map generation by background tracking and structure analysis. Converter 112 can be implemented as a software program and/or hardware device, can be part of user device. 108, or can be a stand-alone device. Also, as an alternative to the configuration of system 100 shown in FIG. 1, converter 112 can be part of media server 104, or part of any network device between user device 108 and media server 104. 2D-to-3D video converter 112 converts 2D video frames into 3D video frames in the original resolution of the decompressed 2D video frames received from video decoder 110 at real-time playback rate on user device 108, and provides (113) 3D video frames to display 114 for 3D displaying. Further, video converter 112 can store the generated 3D video content in a video storage for later playing.

Display 114 is a display device for presentation of video content. For example, display 114 can be provided as a television set, computer monitor, projector, and any other video display device. Display 114 can be located within user device 108, local to user device 108, or remote from user device 108. In some embodiments, 2D-to-3D video converter 112 can be a part of display 114. Further, in other embodiments, both 2D-to-3D video converter 112 and video decoder 110 can also be part of display 114. It is understood that devices shown in FIG. 1 are for illustrative purposes. Certain devices may be removed or combined and other devices may be added.

Figure 2:
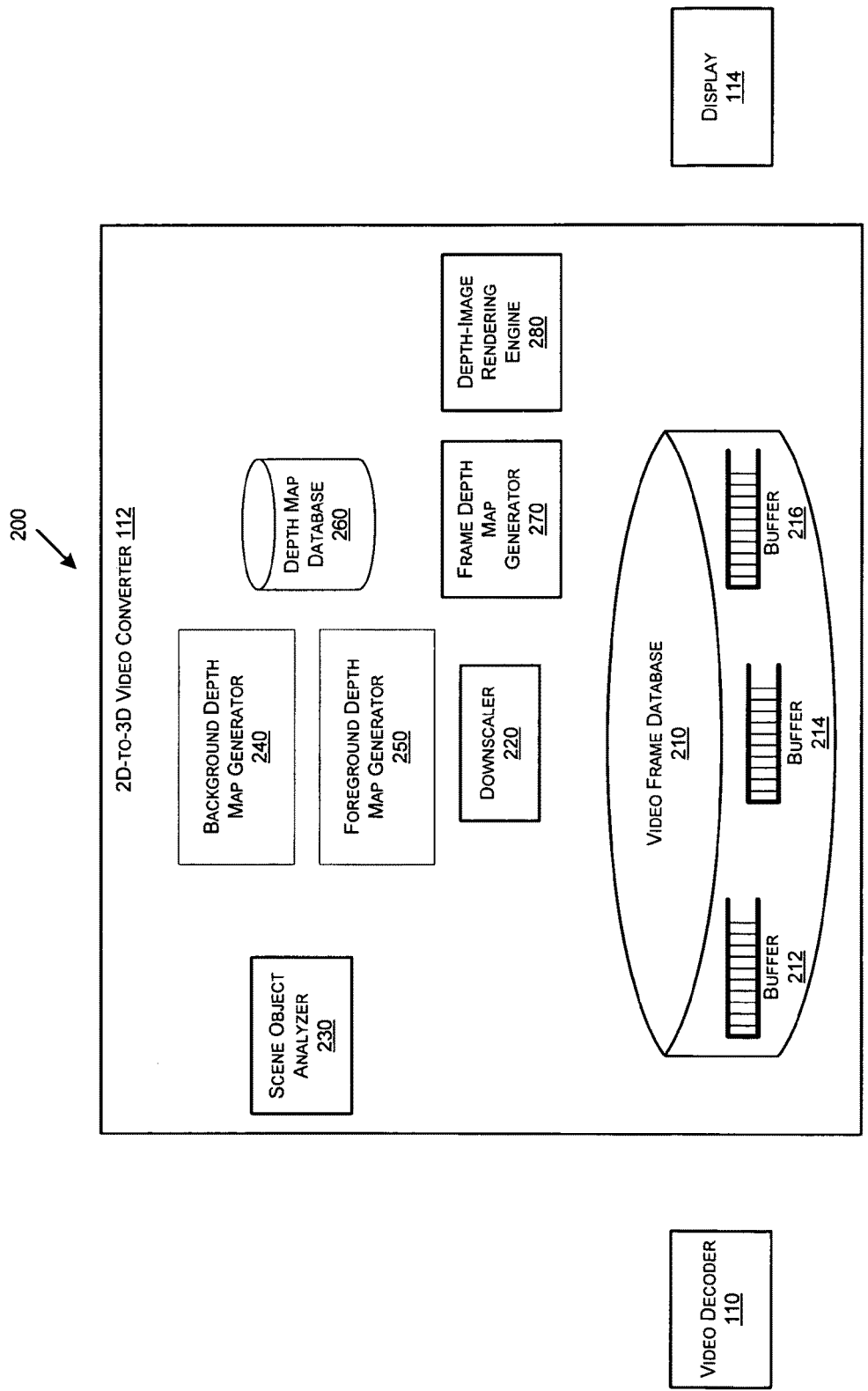
FIG. 2 is a block diagram illustrating an embodiment of the exemplary system of FIG. 1.

FIG. 2 is a block diagram illustrating an exemplary system 200 of FIG. 1. For simplicity, system 200 of FIG. 2 only illustrates video decoder 110, 2D-to-3D video converter 112, and display 114. The illustrated configuration of 2D-to-3D video converter 112 is exemplary only, and persons of ordinary skill in the art will appreciate that the various illustrated elements may be provided as discrete elements or be combined, and be provided as any combination of hardware and software.

With reference to FIG. 2, 2D-to-3D converter 112 can include a video frame database 210 for storing a structured collection of records or data of video frames. The structured storage can be organized as a set of queues, a structured file, a relational database, an object-oriented database, or any other appropriate database.

Computer software, such as a database management system, may be utilized to manage and provide access to the data stored in video frame database 210. Video frame database 210 can be combined with other components of 2D-to-3D video converter 112 or can be external to 2D-to-3D video converter 112. Video frame database 210 can provide buffering to store 2D video frames in original resolution, store 2D video frames downscaled to lower resolution, and store generated 3D video frames. Accordingly, video frame database 210 can, for example, include a buffer 212 to store decoded 2D video frames in original resolution, a buffer 214 to store downscaled 2D video frames, and a buffer 216 to store generated 3D video frames. Two or more of buffers 212, 214, and 216 can be combined as one buffer.

A downscaler 220 can be provided as a software program and/or a hardware device to retrieve from buffer 212 decoded 2D video frames in original resolution and downscale the decoded 2D video frames to a lower resolution. Downscaler 220 can store the downscaled 2D video frames in buffer 214. Downscaler 220 can be a separate element or combined with video frame database 210. As further described below, the downscaled 2D video frames are generated for accelerated background tracking and depth map estimation.

A scene object analyzer 230 can be provided as a software program and/or a hardware device to apply a background tracking algorithm to the downscaled 2D video frames. The background tracking algorithm is executed on the lower-resolution frames, and thus requires less execution time to facilitate real-time 2D-to-3D video conversion.

The background tracking algorithm is based on an assumption that there is a strong continuity of background in neighboring video frames, while salient foreground objects are moving on top of the background. As a result, the moving foreground objects can be segmented out from either a static or smoothly moving background. Scenarios that do not satisfy such conditions can nevertheless be processed because an entire frame can be treated as background. Examples of two scenarios that break the assumption are: (1) the background moves/changes very rapidly, which means the effort to segment foreground objects out from the background may be computationally complex; and (2) the foreground objects move very little and also can be treated as a part of the background, and processed as part of the background structure analysis.

Depending on the size of buffers 212 and 214, a look-ahead processing strategy can be used if future frames are available in buffer 212 when a current frame is processed. For example, assume frames having indices (n−a), (n−a+1), . . . , (n−1), n, (n+1), . . . , (n+b) are available when processing the $n^{th}$ frame. The term "a" can be a value, for example, greater than 5, and the term "b" can be a value, for example, greater than or equal to 0. As the values of "a" and "b" are increased, tracking quality may be improved.

Background tracking algorithm can utilize probabilistic models for density estimation to segment out background and foreground objects by tracking moving objects in the downscaled video frames. For example, the algorithm can use a Gaussian mixture model to model the background and a binary pixel classification mechanism to determine whether a pixel is in the background or not. The algorithm can model intensity values of each pixel as a mixture of Gaussian distributions. In that sense, each pixel intensity is represented by a mixture of K (K is a pre-defined constant value) Gaussian distributions, and each Gaussian distribution is weighted according to the frequency by which it represents the background. Based on comparisons between the distances from the current pixel intensity value to the means of the most influential Gaussian distributions and the associated thresholds correlated to the standard deviations of the Gaussian distributions, the background tracking algorithm can determine which pixels correspond to the background. Pixel values that fit the background distributions are considered background, those pixels that do not fitting the background distributions are considered foreground. The segmentation process results in a background frame having the segmented background Objects in the downscaled lower resolution and a foreground frame having the segmented foreground objects in the downscaled lower resolution.

A background depth map generator 240 can be provided as a software program and/or a hardware device that receives the background objects of the downscaled frame, and generates a background depth map. Generator 240 can perform, among other things, structure analysis and depth map estimation on the background objects segmented out by scene object analyzer 230. Applying structure analysis only on the segmented background objects can speed up processing as well as increase the accuracy of the results.

Background depth map generator 240 is configured to perform structure analysis pre-processing of the background objects segmented from the downscaled frame to yield information for background depth map estimation. Various methods can be used in this pre-processing. For example, such pre-processing may include detecting a vanishing point and vanishing lines of the background frame based on the segmented background objects. The vanishing point represents a most distant point from an observer, and the vanishing lines represent a direction of depth increase. The vanishing lines converge at the vanishing point. A region of the background frame having the greatest number of intersections is considered to be the vanishing point, and the main straight lines passing through or close to the vanishing point are considered to be vanishing lines. If no vanishing point is found, a default vanishing point, also referred to herein as a convergent point, on top of the background frame is used as the vanishing point and a default vanishing line is a vertical line running from top to bottom of the background frame and passing through the default vanishing point. Other methods known to those skilled in the art can also be used to determine the vanishing point and vanishing lines of the background.

Based on the information provided by background structure analysis, a background depth map can be derived. For example, with the detected vanishing point and the vanishing lines, background depth map generator 240 can generate a depth map of the background accordingly. For example, background depth map generator 240 can generate different depth gradient planes with the vanishing point being at the farthest distance and the vanishing lines indicating the direction of receding depth. Generator 240 can then assign a depth level to every pixel on the depth gradient planes. Generator 240 may additionally perform calibration steps, and finally derive the background depth map.

A foreground depth map generator 250 can be provided as a software program and/or a hardware device that receives the foreground objects segmented out of the downscaled frame, and generates a foreground depth map. Generator 250 can perform, among other things, skeleton depth estimation and depth map estimation on foreground objects.

Skeleton depth estimation includes object skeletonization. Such skeletonization may be performed by decomposing a foreground object shape into a skeleton defined as connected midpoints between two boundary points in the horizontal direction, and determine distances of the boundary points from the skeleton in the horizontal direction. The object boundary can be recovered from its skeleton and distance data. The skeleton points are connected in the vertical (y-axis) direction, which facilitates processing.

For foreground depth map estimation, it is assumed that a foreground object is typically oriented vertically within a scene, so that frontal skeleton points of the object have the same depth as a bottom point of the skeleton. To reduce computational complexity, foreground depth map generator 250 can obtain the skeleton by scanning the foreground object and finding a middle point of the horizontal scan-line segment within the object.

The bottom point of the skeleton, which is on the boundary of the foreground and background, the depth of which was previously determined by background depth map generator 240. Thus, foreground depth map generator 250 can determine the depth of the bottom point of the skeleton based on the depth of its neighboring background, and determine the depth for all skeleton points because they have the same depth. Also, the depth of boundary points of the foreground object can be readily determined because the boundary points share the same depth with their neighboring background. The depth of the boundary points can be adjusted for a better 3D effect.

For each horizontal scan-line segment in the foreground object, with the depth for both the skeleton point (the middle point) and the boundary points having been determined, foreground depth map generator 250 can interpolate internal points (between the skeleton point and the boundary points) on the scan-line segment with a Gaussian distribution function. For each internal point, two weights can be generated from the Gaussian function depending on the distances from the internal point to the skeleton point and to the boundary points. Foreground depth map generator 250 can then derive the depth for the internal point through a non-linear interpolation process. Using this approach, the foreground thickness effect is enhanced to further strengthen the 3D depth effect.

Based on the determined points and depths, foreground depth map generator 250 can generate the foreground depth map.

A depth map database 260 can be a structured collection of records or data of video background and foreground object depth maps and their corresponding frame depth maps. The database structure can be organized as a set of queues, a structured file, a relational database, an object-oriented database, or other appropriate database. Computer software, such as a database management system, may be utilized to manage and provide access to depth map database 260. Depth map database 260 can store and provide background and foreground object depth maps of video frames and their corresponding frame depth maps, and can provide a depth value for a particular pixel of a background and/or a foreground object. Depth map database 260 can be combined with other components of 2D-to-3D video converter 112, and can be external to 2D-to-3D video converter 112.

A frame depth map generator 270 can be a software program and/or a hardware device that retrieves foreground and background depth maps of a frame in downscaled resolution, and derives a frame depth map in original resolution. Generator 270 fuses the foreground and background depth maps in the original resolution and refines the depth continuity for the original resolution image. The frame depth map can be derived through an interpolation filtering process based on desired computational complexity. A variety of choices for interpolation can be used. For example, when implementing one solution to duplicate depths in the down-scaled map to result in an upscaled depth map having a higher resolution, a linear interpolation can be chosen to use a weighted average depth value from its neighboring pixels in the same scan-line to fill these positions in the upscaled depth map. More complicated filters such as bilinear or bicubic interpolation solutions can also be used. To achieve a better effect for a currently processed frame, frame depth map generator 270 can retrieve more than one neighboring decoded frame in original resolution and their corresponding depth maps.

A depth-image rendering engine 280 can be a software program and/or a hardware device that retrieves frame depth maps and video frames in original resolution and applies depth-image based rendering ("DIBR") algorithms to generate multi-view video frames for 3D display. DIBR algorithms can produce 3D representation based on 2D images of an object and corresponding depth maps. To achieve a better 3D effect for a currently processed frame, depth-image rendering engine 280 can utilizes one or more neighboring decoded frames in original resolution and their depth maps.

DIBR algorithms can include 3D image warping. 3D image warping changes view direction and viewpoint of an object, and transforms pixels in a reference image of the object to a destination view in a 3D environment based on depth values of the pixels. A function can be used to map pixels from the reference image to the destination view. Depth-image rendering engine 280 can adjust and reconstruct the destination view to achieve a better effect.

DIBR algorithms can also include plenoptic image modeling. Plenoptic image modeling provides 3D scene information of an image visible from arbitrary viewpoints. The 3D scene information can be obtained by a function based on a set of reference images with depth information. These reference images are warped and combined to form 3D representations of the scene from a particular viewpoint. For an improved effect, depth-image rendering engine 280 may adjust and reconstruct the 3D scene information. Base on the 3D scene information, depth-image rendering engine 280 can generate multi-view video frames for 3D displaying.

Figure 3:
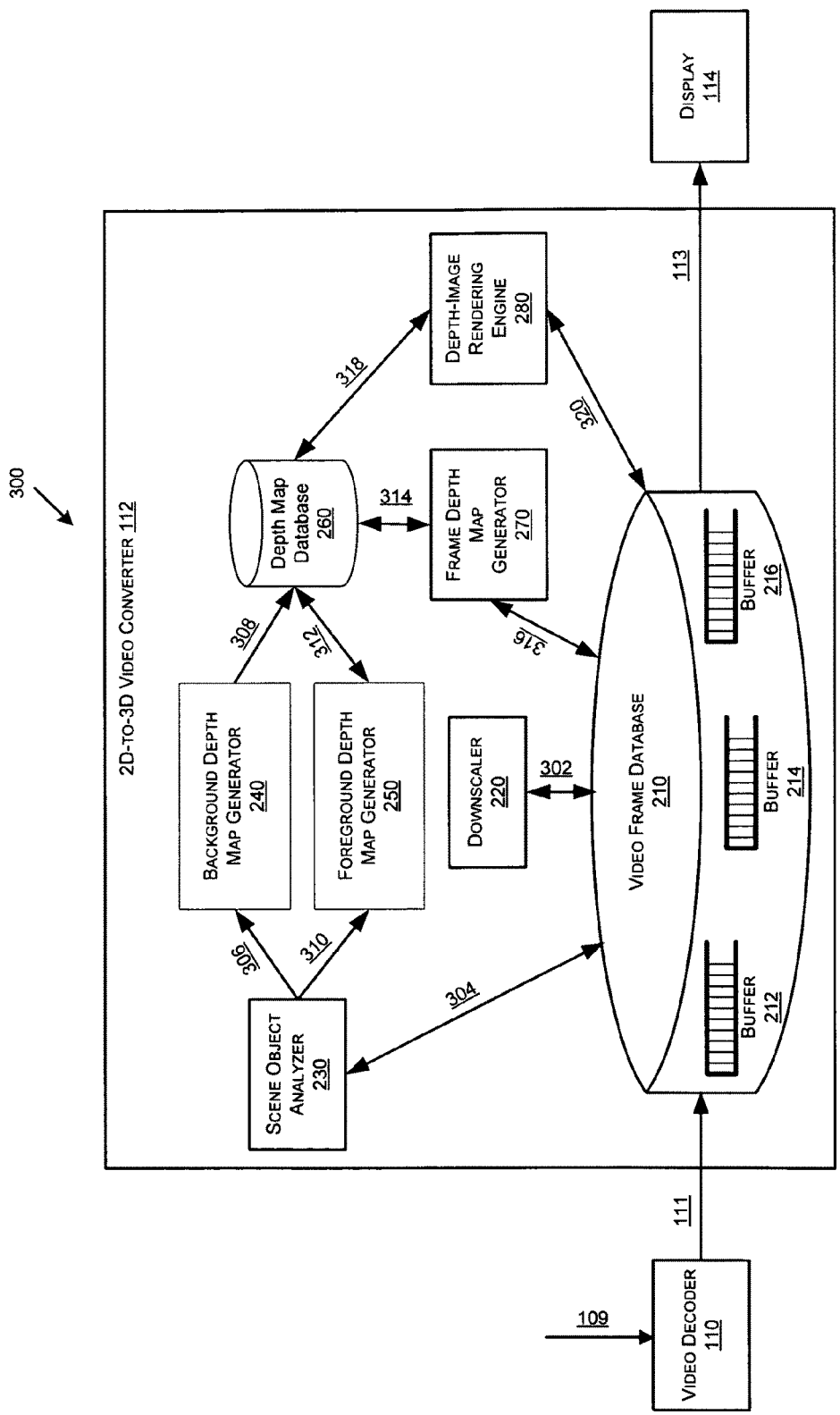
FIG. 3 is a functional diagram illustrating an exemplary communication flow in the embodiment of FIG. 2.

FIG. 3 is a functional diagram illustrating an exemplary communication flow for real-time 3D video depth map generation by background tracking and structure analysis in exemplary system 200 of FIG. 2. After receiving (109) a 2D video bitstream, video decoder 110 can decode the video bitstream into 2D video frames, and store (111) the decoded 2D video frames in video frame database 210. More particularly, video frame database 210 can store in buffer 212 the decoded 2D video frames in their original resolution. Each decoded 2D video frame can include a unique identifier (frame ID) for later retrieval and association purpose.

Downscaler 220 can retrieve (302) from buffer 212 the decoded 2D video frames in original resolution, downscale the decoded 2D video frames to lower resolution, and store (302) the downscaled 2D video frames in buffer 214. Alternatively, downscaled 2D video frames can be passed in communication pipeline flows and be processed on the fly without being stored in buffer 214. Each downscaled 2D video frame is associated with a decoded 2D video frame with original resolution and retains the frame ID of the corresponding decoded 2D video frame with original resolution. The association can be based on the frame ID.

Scene object analyzer 230 can retrieve (304) from buffer 214 downscaled 2D video frames, and apply the above described background tracking algorithm to each frame to segment objects into background objects and foreground objects. In some embodiments, Analyzer 230 may receive the downscaled 2D video frames from communication pipeline flows and process each of the downscaled 2D video frames on the fly based on a pixel by pixel order for the segmentation. As described above, for better tracking quality, scene object analyzer 230 may retrieve more than one neighboring downscaled video frame when processing a current downscaled video frame. The segmented background objects of a downscaled video frame are associated with the segmented foreground objects of the downscaled video frame. The association can be based on the frame ID of the downscaled video frame. Scene object analyzer 230 provides (306) the segmented background objects to background depth map generator 240, and provides (310) the segmented foreground objects to foreground depth map generator 250.

After receiving (306) the segmented background objects of a downscaled video frame, background depth map generator 240 applies structure analysis and depth map estimation to the background objects to generate a background depth map, as described above. The background depth map can provide a depth value for each pixel of the background objects. Background depth map generator 240 can store (308) in depth map database 260, among other things, the background depth map and the frame ID of the corresponding downscaled video frame, for later processing. The background depth map can be retrieved by the frame ID.

Upon receiving (310) the segmented foreground objects of the downscaled video frame, foreground depth map generator 250 applies skeleton depth estimation and depth map estimation on the foreground objects to generate a foreground depth map, as described above. The foreground depth map can provide a depth value for each pixel of the foreground objects. Foreground depth map generator 250 can store (312) in depth map database 260, among other things, the foreground depth map and the frame ID of the corresponding downscaled video frame, for later processing. The foreground depth map can be retrieved by the frame ID. The foreground depth map can be associated with the corresponding background depth map based on the frame ID.

Frame depth map generator 270 can obtain (314) foreground and background depth maps of a downscaled video frame from depth map database 260, retrieve (316) the corresponding decoded 2D video frame with original resolution, and apply frame depth estimation to generate a frame depth map in original resolution, as described above. To achieve an improved effect for a currently processed frame, frame depth map generator 270 may adjust the frame depth map based on one or more neighboring decoded 2D video frames with original resolution and their corresponding background and foreground depth maps. Frame depth map generator 270 can store (314) in depth map database 260, among other things, the frame depth map in original resolution and associated frame ID of the corresponding video frame. Alternatively, the generated foreground, background, and frame depth maps can be passed in communication pipeline flows without being stored in depth map database 260.

Based on the frame depth map retrieved (318) from depth map database 260 or the communication pipeline flows and the retrieved (320) corresponding decoded 2D video frame with original resolution from buffer 212, depth-image rendering engine 280 applies DIBR algorithms to generate a multi-view (3D) video frame, as described above. To achieve a desired 3D effect for a currently processed frame, depth-image rendering engine 280 may adjust the 3D video frame based on one or more neighboring decoded frames with original resolution and their corresponding depth maps. Depth-image rendering engine 280 can store (320) the generated 3D video frame at buffer 216, which in turn provides (113) the generated frame to display 114 for 3D displaying.

Figure 4:
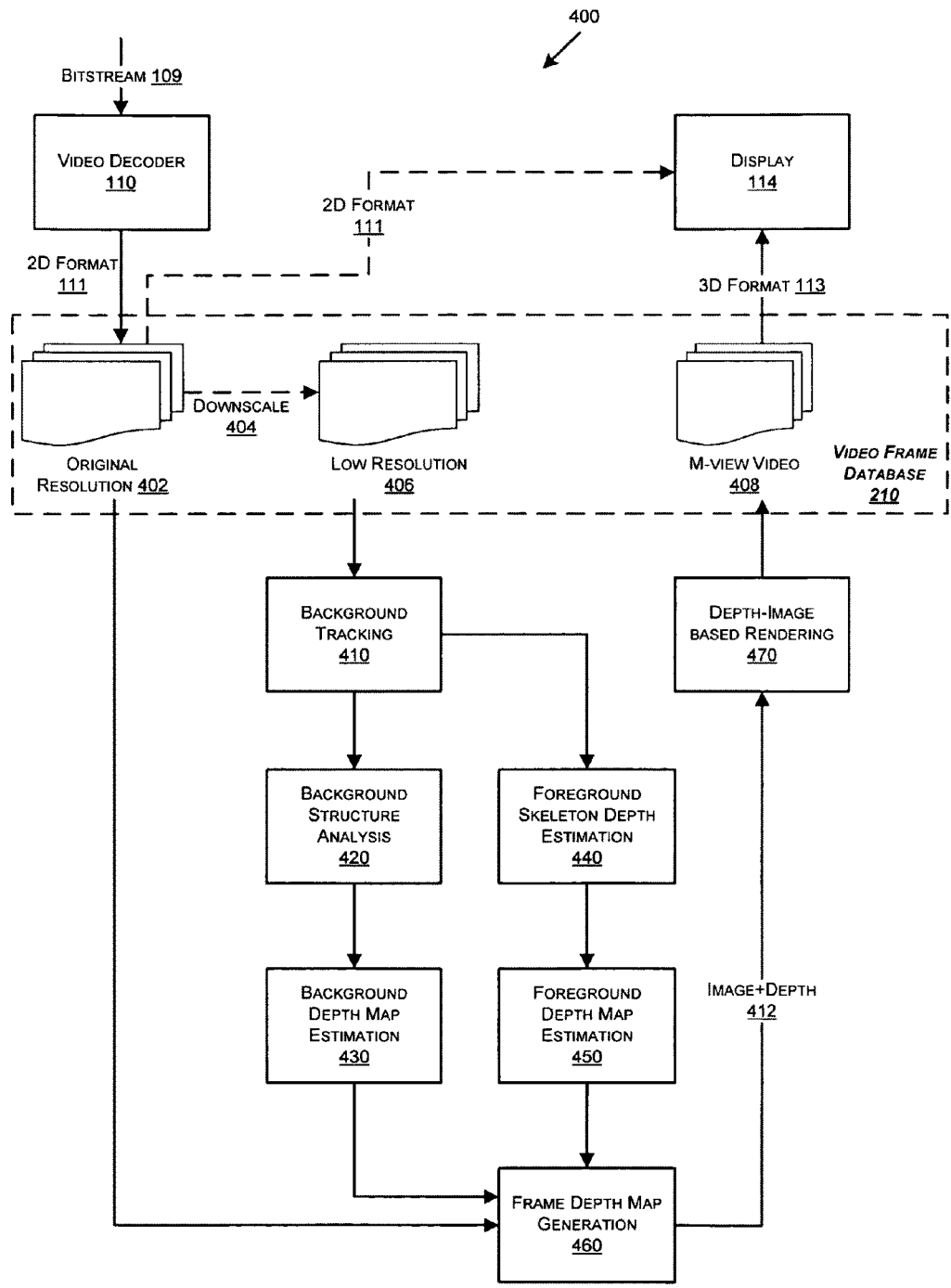
FIG. 4 illustrates an exemplary process flow of real-time 3D video depth map generation.

FIG. 4 illustrates an exemplary process flow of real-time 3D video depth map generation by background tracking and structure analysis. It will now be appreciated by one of ordinary skill in the art that the illustrated process can be altered to delete steps, change the order of steps, or include, additional steps.

A 2D video bitstream is first received (109) and decoded by video decoder 110 to provide decoded video frames 402 in original resolution that can be stored in video frame database 210 for future display. In addition to the decoded video frames 402 in the original resolution (for example, 640 by 480), an associated set of lower-resolution frames 406 (for example 240 by 135) can be generated (404) and stored in video frame database 210 for accelerated background tracking (410) and depth map estimation. Alternatively, the associated set of lower-resolution frames 406 can be passed in process pipeline flows without being stored in video frame database 210. By tracking moving objects in the lower-resolution frames 406, the background and foreground objects can be segmented from each other, as described above.

Next, the background and foreground objects are subjected to separate depth map estimation process. A background depth map is generated based on, among other things, background structure analysis (420) and background depth map estimation (430), as described above. A foreground depth map is generated based on, among other things, foreground skeleton depth estimation (440) and foreground depth map estimation (450), as described above.

The final frame depth map is generated (460) by fusing background and foreground depth maps in the original resolution, as described above. Using DIBR algorithms (470), multi-view (3D) video frames 408 for 3D displaying are generated from the frame depth map and images of frames in original resolution, as described above. 3D video frames 408 can be stored in video frame database 210 and provided (113) to display 114 for displaying.

Figure 5:
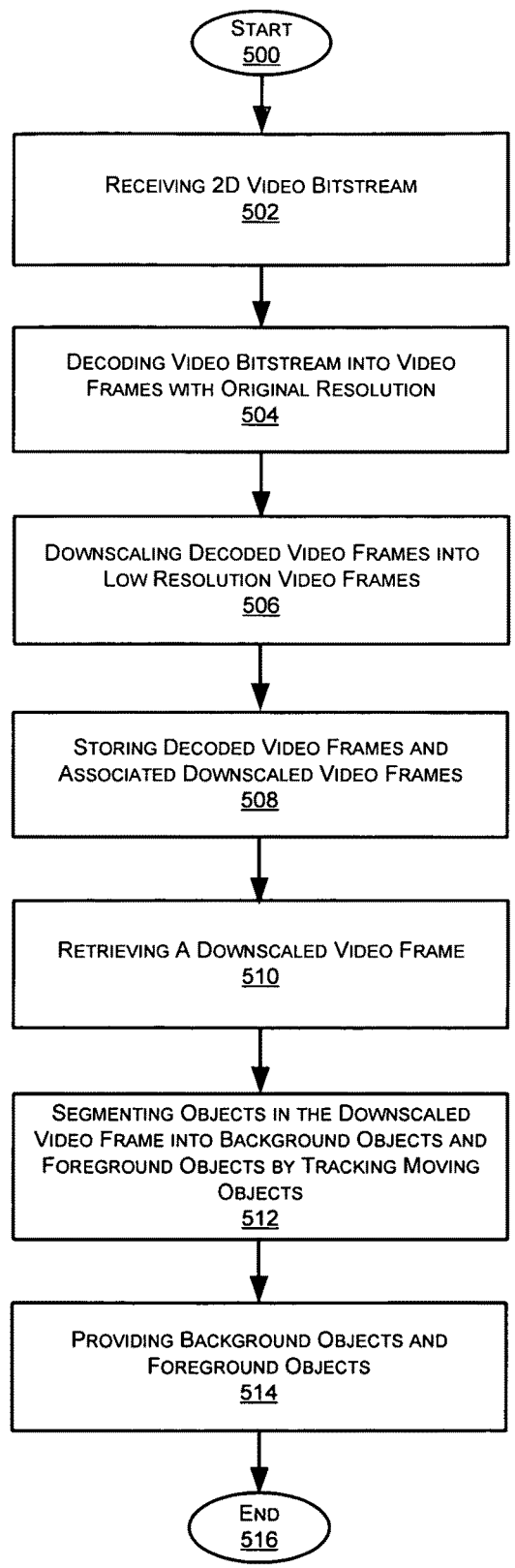
FIG. 5 is a flowchart representing an exemplary method of background object segmentation.

FIG. 5 is a flowchart representing an exemplary method of background object segmentation by tracking moving objects in a lower-resolution video frame. It will now be appreciated by one of ordinary skill in the art that the illustrated procedure can be altered to delete steps, change the order of steps, or include additional steps. After initial start step 500, downscaler 220 of 2D-to-3D video converter 112 receives (502) a 2D video bitstream from, for example, user device 108, or video storage medium 102, or media server 104 through network 106. Then, video decoder 110 decodes (504) the video bitstream into a set of video frames in original resolution. Each decoded video frame can have a unique identifier (frame ID).

Downscaler 220 downscaler (506) the decoded video frames into lower-resolution video frames: Each downscaled video frame can retain the frame ID of the corresponding decoded video frame in the original resolution. Scene object analyzer 230 can store (508) the decoded video frames and the associated downscaled video frames. The association can be based on the frame IDs.

Scene object analyzer 230 retrieves (510) a downscaled video frame, and segments (512) objects in the downscaled video frame into background objects and foreground objects by tracking moving objects in the downscaled video frame, as described above. In some embodiments, the associated downscaled video frames may not be stored, and Analyzer 230 can process each of the downscaled 2D video frames on the fly based on a pixel by pixel order for the segmentation. After the segmentation process, each pixel in the downscaled video frame can be determined to be in the background or foreground.

Using the background modeling and tracking approach, more than one neighboring downscaled video frames are used in the statistics modeling for segmenting the current frame. The segmented background and foreground objects can be associated by, for example, the frame ID of the downscaled video frame. Scene object analyzer 230 provides (514) the segmented background and foreground objects for further process. The method then ends (516).

Figure 6:
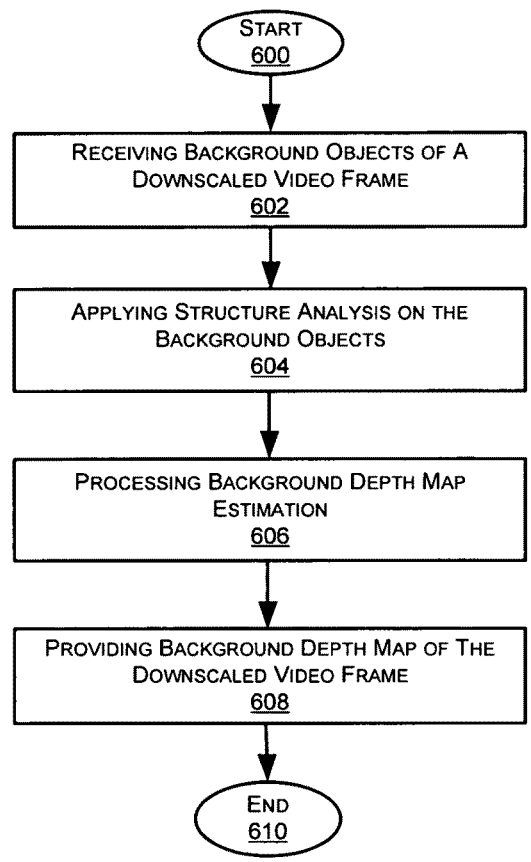
FIG. 6 is a flowchart representing an exemplary method of background depth map generation.

FIG. 6 is a flowchart representing an exemplary method of background depth map generation by applying structure analysis on background objects of a lower-resolution video frame. It will now be appreciated by one of ordinary skill in the art that the illustrated procedure can be altered to delete steps, change the order of steps, or include additional steps. After initial start step 600, background depth map generator 240 of 2D-to-3D video converter 112 receives (602) segmented background objects of the downscaled (lower-resolution) video frame.

Background depth map generator 240 applies (604) structure analysis and process (606) background depth map estimation to the background objects to generate a background depth map, as described above. The process provides a depth value for each pixel of the background objects. The background depth map is associated with the corresponding downscaled video frame. The association can be the frame ID of the downscaled video frame. Background depth map generator 240 provides (608) the background depth map for further processing. The method then ends (610).

Figure 7:
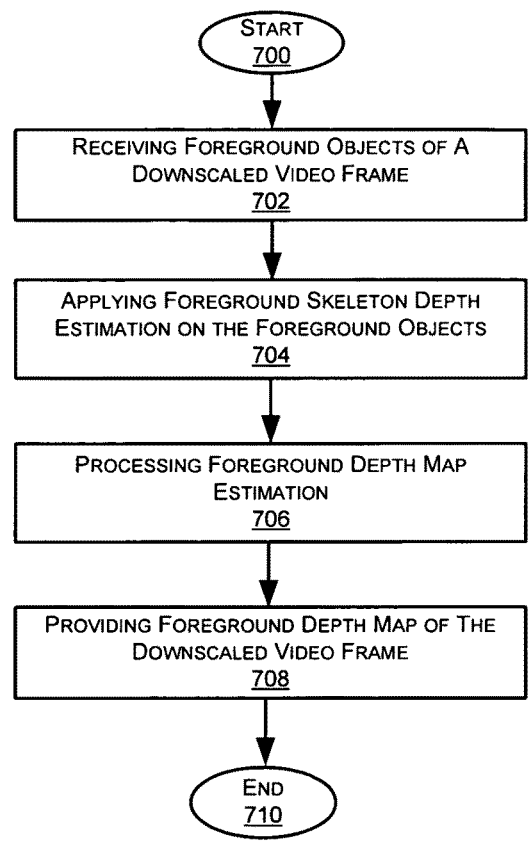
FIG. 7 is a flowchart representing an exemplary method of foreground depth map generation.

FIG. 7 is a flowchart representing an exemplary method of foreground depth map generation by applying depth map estimation to the foreground objects of a lower-resolution video frame. It will now be appreciated by one of ordinary skill in the art that the illustrated procedure can be altered to delete steps, change the order of steps, or include additional steps. After initial start step 700, foreground depth map generator 250 of 2D-to-3D video converter 112 receives (702) segmented foreground objects of a downscaled (lower-resolution) video frame.

Foreground depth map generator 250 applies (704) skeleton depth estimation to the foreground objects and processes (706) foreground depth map estimation to generate a foreground depth map, as described above. The foreground depth map provides depth value for each pixel of the foreground objects. The foreground depth map is associated with the corresponding downscaled video frame. The association can be the frame ID of the downscaled video frame. Foreground depth map generator 250 provides (708) the foreground depth map for further process. The method then ends (710).

Figure 8:
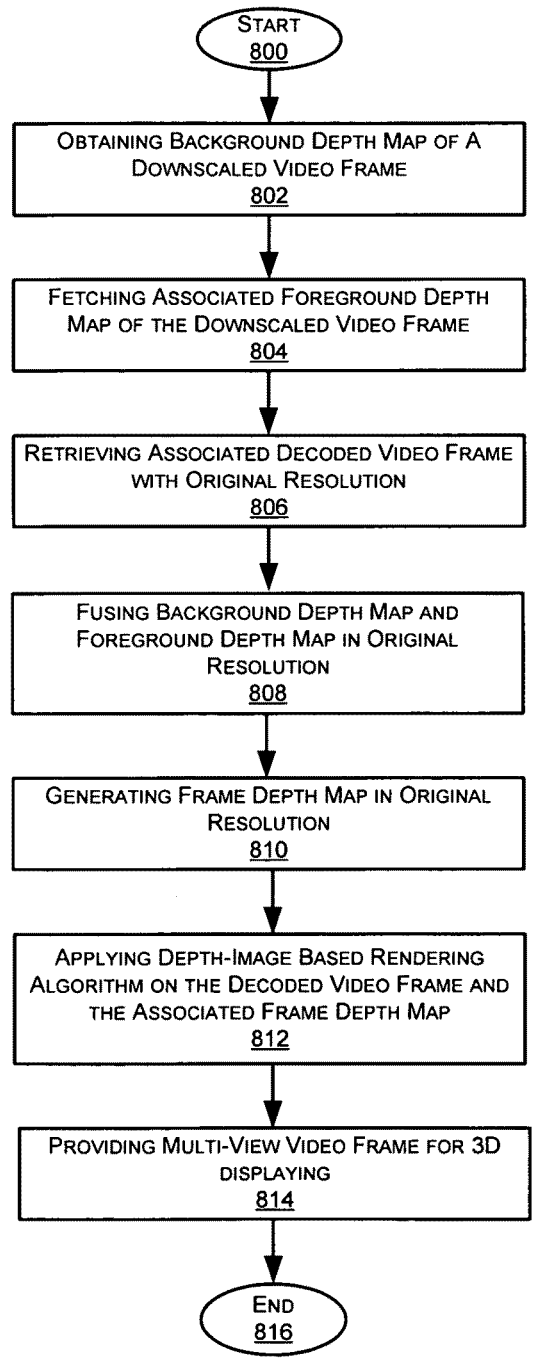
FIG. 8 is a flowchart representing an exemplary method of frame depth map generation.

FIG. 8 is a flowchart representing an exemplary method of frame depth map generation by fusing, in original resolution, background depth map and foreground depth map of a lower-resolution video frame. It will now be appreciated by one of ordinary skill in the art that the illustrated procedure can be altered to delete steps, change the order of steps, or include additional steps. After initial start step 800, frame depth map generator 270 of 2D-to-3D video converter 112 obtains (802) the background depth map of a downscaled (lower-resolution) video frame, fetches (804) the associated foreground depth map, and retrieves (806) the associated decoded video frame in original high resolution.

Frame depth map generator 270 fuses (808) the background and foreground depth maps in original resolution, and applies interpolation filter process and other calibration steps to generate (810) a frame depth map in original resolution, as described above. To achieve an improved effect for a currently processed frame, frame depth map generator 270 may retrieve more than one neighboring decoded 2D video frame in original resolution and corresponding depth maps. The frame depth map can be associated with the corresponding video frame with original resolution. The association can be based on the frame ID of the video frame.

Based on the retrieved decoded video frame in original high resolution and the associated frame depth map, depth-image rendering engine 280 of 2D-to-3D video converter 112 applies (812) depth-image based rendering algorithms to generate a multi-view (3D) video frame, as described above. To achieve a better 3D effect for a currently processed frame, depth-image rendering engine 280 may retrieve more than one neighboring decoded frame in original resolution and associated depth maps. Depth-image rendering engine 280 provides (814) the generated 3D video frame for displaying. The method then ends (816).

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, single central processing unit (CPU) chip, a CPU chip combined on a motherboard, a general purpose computer, or any other combination of devices or modules capable of performing the real-time 2D to 3D video conversion technology disclosed herein.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A computer-implemented method for real-time 2D to 3D video conversion, comprising:
   receiving a decoded 2D video frame having an original resolution;
   downscaling the decoded 2D video frame into an associated 2D video frame having a lower resolution;
   storing in a video frame database the decoded 2D video frame in association with the downscaled 2D video frame, wherein the decoded 2D video frame is associated with the downscaled 2D video frame by a unique identifier that uniquely identifies the decoded 2D video frame having the original resolution and the associated downscaled 2D video frame having the lower resolution;
   segmenting objects present in the downscaled 2D video frame into background objects and foreground objects;
   generating a background depth map and a foreground depth map for the downscaled 2D video frame based on the segmented background and foreground objects;
   retrieving the decoded 2D video frame having the original resolution based on the unique identifier;
   deriving a frame depth map in the original resolution based on the retrieved decoded 2D video frame having the original resolution and both the background depth map and the foreground depth map that are generated in the downscaled lower resolution; and
   providing a 3D video frame for display at a real-time playback rate, wherein the 3D video frame is generated in the original resolution based on the frame depth map.

2. The method of claim 1, further comprising:
   decoding a received 2D video bitstream to provide the decoded 2D video frame having the original resolution.

3. The method of claim 1, further comprising:
   processing the downscaled 2D video frame based on a pixel by pixel order for the segmenting.

4. The method of claim 1, further comprising:
   receiving a plurality of decoded 2D video frames, the downscaling including downscaling the plurality of the decoded 2D video frames to provide an associated plurality of downscaled 2D video frames; and
   performing the segmenting based on tracking moving objects in each of the plurality of the downscaled 2D video frames.

5. The method of claim 1, further comprising:
   receiving a plurality of decoded 2D video frames, the downscaling including downscaling the plurality of the decoded 2D video frames to provide an associated plurality of downscaled 2D video frames; and
   performing the segmenting based on tracking moving objects in at least one of the plurality of the downscaled 2D video frames and at least one neighboring downscaled frame, the at least one neighboring downscaled frame preceding or following the at least one downscaled 2D video frame.

6. The method of claim 1, wherein the generating the background depth map comprises:
applying structure analysis to the background objects segmented from the downscaled 2D video frame, wherein the segmented background objects form a background frame in the lower resolution; and
deriving the background depth map based on the structure analysis.

7. The method of claim 6, wherein the structure analysis comprises:
detecting, if present, a vanishing point and one or more vanishing lines of the background frame based on the segmented background objects, wherein the vanishing point represents a most distant point from an observer, and the one or more vanishing lines represent a direction of increasing depth.

8. The method of claim 7, wherein the detecting further comprises, if no vanishing point is detected, determining a default vanishing point as a convergent point on top of the background frame and a default vanishing line as a vertical line passing through the default vanishing point from top to bottom of the background frame.

9. The method of claim 1, further comprising:
associating the generated background depth map with the downscaled 2D video frame by a unique identifier that uniquely identifies the generated background depth map and the associated downscaled 2D video frame.

10. The method of claim 1, wherein the generating the foreground depth map comprises:
applying foreground skeleton depth estimation to the foreground objects segmented from the downscaled 2D video frame; and
deriving the foreground depth map based on the depth estimation.

11. The method of claim 10, wherein the foreground skeleton depth estimation comprises:
decomposing the foreground object into a skeleton and distances of boundary points from the skeleton in a horizontal direction, wherein the skeleton is vertically connected midpoints between two boundary points in the horizontal direction.

12. The method of claim 1, further comprising:
associating the generated foreground depth map with the downscaled 2D video frame by a unique identifier that uniquely identifies the generated foreground depth map and the associated downscaled 2D video frame.

13. The method of claim 1, wherein the deriving the frame depth map comprises:
fusing, in the original resolution, the background depth map and the foreground depth map; and
generating the frame depth map in the original resolution based on the fusing.

14. The method of claim 1, further comprising:
adjusting the derived frame depth map based at least one neighboring decoded 2D video frame with the original resolution and corresponding background and foreground depth maps of the at least one neighboring decoded 2D video frame, wherein the at least one neighboring decoded 2D video frame precedes or follows the decoded 2D video frame having the original resolution.

15. The method of claim 1, further comprising:
storing the generated frame depth map in association with the decoded 2D video frame having the original resolution by a unique identifier that uniquely identifies the generated frame depth map and the associated decoded 2D video frame; and
providing from storage the generated frame depth map for generating the 3D video frame.

16. The method of claim 1, further comprising:
adjusting the generated 3D video frame based at least one neighboring decoded 2D video frame in original resolution and a corresponding frame depth map of the at least one neighboring decoded 2D video frame, wherein the at least one neighboring decoded 2D video frame precedes or follows the decoded 2D video frame having the original resolution.

17. The method of claim 1, wherein providing the 3D video frame further comprises:
applying a depth image based rendering algorithm to the decoded 2D video frame and the frame depth map; and
adjusting the depth image based rendering based on at least one neighboring decoded 2D frame in original resolution and a corresponding frame depth map of the at least one neighboring decoded 2D frame, wherein the at least one neighboring decoded 2D video frame precedes or follows the decoded 2D video frame having the original resolution.

18. A 2D-to-3D video converter coupled to receive a decoded 2D video frame having an original resolution, the 2D-to-3D video converter comprising:
a downscaler to downscale the decoded 2D video frame into an associated 2D video frame having a lower resolution;
a video frame database to store the decoded 2D video frame in association with the downscaled 2D video frame, wherein the decoded 2D video frame is associated with the downscaled 2D video frame by a unique identifier that uniquely identifies the decoded 2D video frame having the original resolution and the associated downscaled 2D video frame having the lower resolution;
a scene object analyzer to segment objects present in the downscaled 2D video frame into background objects and foreground objects;
a first depth map generator to generate a background depth map and a foreground depth map for the downscaled 2D video frame based on the segmented background and foreground objects;
a second depth map generator to retrieve the decoded 2D video frame having the original resolution based on the unique identifier, and derive a frame depth map in the original resolution based on the retrieved decoded 2D video frame having the original resolution and both the background depth map and the foreground depth map that are generated in the downscaled lower resolution; and
a rendering engine to provide a 3D video frame for display at a real-time playback rate on a user device, wherein the 3D video frame is generated in the original resolution based on the frame depth map.

19. The 2D-to-3D video converter of claim 18, wherein the user device is one of a mobile device, a computer, or a video playing device.

20. The 2D-to-3D video converter of claim 18, wherein the converter is further coupled to receive a plurality of decoded 2D video frames, the downscaling including downscaling the plurality of the decoded 2D video frames to provide an associated plurality of downscaled 2D video frames; and
wherein the scene object analyzer is configured to segment the objects based on tracking moving objects in each of the plurality of the downscaled 2D video frames.

21. The 2D-to-3D video converter of claim 18, wherein the converter is further coupled to receive a plurality of decoded 2D video frames, the downscaling including downscaling the plurality of the decoded 2D video frames to provide an associated plurality of downscaled 2D video frames; and wherein the scene object analyzer is configured to segment the objects based on tracking moving objects in at least one of the plurality of the downscaled 2D video frames and at least one neighboring downscaled frame, the at least one neighboring downscaled frame preceding or following the at least one downscaled 2D video frame.

22. The 2D-to-3D video converter of claim 18, wherein the first depth map generator is configured to:

apply structure analysis to the background objects segmented from the downscaled 2D video frame, wherein the segmented background objects form a background frame in the lower resolution; and generate the background depth map based on the structure analysis.

23. The 2D-to-3D video converter of claim 22, wherein the first depth map generator is further configured to:

detect, if present, a vanishing point and one or more vanishing lines of the background frame based on the segmented background objects, wherein the vanishing point represents a most distant point from an observer, and the one or more vanishing lines represent a direction of increasing depth.

24. The 2D-to-3D video converter of claim 23, wherein the first depth map generator is further configured to:

determine, if no vanishing point is detected, a default vanishing point as a convergent point on top of the background frame and a default vanishing line as a vertical line passing through the default vanishing point from top to bottom of the background frame.

25. The 2D-to-3D video converter of claim 18, further comprising: a depth map database to store the generated background depth map and the generated foreground depth map in association with the downscaled 2D video frame by a unique identifier that uniquely identifies the generated background depth map, the generated foreground depth map, and the associated downscaled 2D video frame, and store the derived frame depth map in association with the decoded 2D video frame having the original resolution by a unique identifier that uniquely identifies the generated frame depth map and the associated decoded 2D video frame.

26. The 2D-to-3D video converter of claim 18, wherein the first depth map generator is configured to:

apply foreground skeleton depth estimation to the foreground objects segmented from the downscaled 2D video frame; and derive the foreground depth map based on the depth estimation.

27. The 2D-to-3D video converter of claim 26, wherein the first depth map generator is further configured to:

decompose the foreground object into a skeleton and distances of boundary points from the skeleton in a horizontal direction, wherein the skeleton is vertically connected midpoints between two boundary points in the horizontal direction.

28. The 2D-to-3D video converter of claim 18, wherein the second depth map generator is configured to:

fuse, in the original resolution, the background depth map and the foreground depth map; and derive the frame depth map in the original resolution based on the fusing.

29. The 2D-to-3D video converter of claim 18, wherein the second depth map generator is configured to:

adjust the derived frame depth map based at least one neighboring decoded 2D video frame with the original resolution and corresponding background and foreground depth maps of the at least one neighboring decoded 2D video frame, wherein the at least one neighboring decoded 2D video frame precedes or follows the decoded 2D video frame having the original resolution.

30. The 2D-to-3D video converter of claim 18, wherein the rendering engine is configured to:

adjust the generated 3D video frame based at least one neighboring decoded 2D video frame in original resolution and a corresponding frame depth map of the at least one neighboring decoded 2D video frame, wherein the at least one neighboring decoded 2D video frame precedes or follows the decoded 2D video frame having the original resolution.

31. The 2D-to-3D video converter of claim 18, wherein the rendering engine is configured to:

apply a depth image based rendering algorithm to the frame depth map and the images in the associated decoded 2D video frame in the original resolution to generate the 3D video frame; and adjust the depth image based rendering based on at least one neighboring decoded 2D frame in original resolution and a corresponding frame depth map of the at least one neighboring decoded 2D frame, wherein the at least one neighboring decoded 2D video frame precedes or follows the decoded 2D video frame having the original resolution.

32. A non-transitory computer readable medium storing instructions that, when executed, cause a computer to perform a method for real-time 2D to 3D video conversion, the method comprising:

receiving a decoded 2D video frame having an original resolution;

downscaling the decoded 2D video frame into an associated 2D video frame having a lower resolution;

storing in a video frame database the decoded 2D video frame in association with the downscaled 2D video frame, wherein the decoded 2D video frame is associated with the downscaled 2D video frame by a unique identifier that uniquely identifies the decoded 2D video frame having the original resolution and the associated downscaled 2D video frame having the lower resolution;

segmenting objects present in the downscaled 2D video frame into background objects and foreground objects;

generating a background depth map and a foreground depth map for the downscaled 2D video frame based on the segmented background and foreground objects;

retrieving the decoded 2D video frame having the original resolution based on the unique identifier;

deriving a frame depth map in the original resolution based on the retrieved decoded 2D video frame having the original resolution and both the background depth map and the foreground depth map that are generated in the downscaled lower resolution; and providing a 3D video frame for display at a real-time playback rate, wherein the 3D video frame is generated in the original resolution based on the frame depth map.

* * * * *